United States Patent
Ortuno Ayuso et al.

(10) Patent No.: US 12,173,772 B2
(45) Date of Patent: Dec. 24, 2024

(54) ADJUSTABLE SUSPENSION FOR A BICYCLE

(71) Applicant: DECATHLON, Villeneuve d'Ascq (FR)

(72) Inventors: Pablo Ortuno Ayuso, Villeneuve d'Ascq (FR); Zigor Garate, Vileneuve d'Ascq (FR)

(*) Notice: Subject to any disclaimer, the term of this patent is extended or adjusted under 35 U.S.C. 154(b) by 565 days.

(21) Appl. No.: 17/422,213

(22) PCT Filed: Mar. 5, 2020

(86) PCT No.: PCT/FR2020/050443
§ 371 (c)(1),
(2) Date: Jul. 12, 2021

(87) PCT Pub. No.: WO2020/193897
PCT Pub. Date: Oct. 1, 2020

(65) Prior Publication Data
US 2022/0082148 A1    Mar. 17, 2022

(30) Foreign Application Priority Data
Mar. 22, 2019  (FR) ...................... 1903006

(51) Int. Cl.
*F16F 9/43*      (2006.01)
*B62K 25/04*     (2006.01)

(52) U.S. Cl.
CPC .............. *F16F 9/435* (2013.01); *B62K 25/04* (2013.01); *B62K 2201/08* (2013.01)

(58) Field of Classification Search
CPC .. B62K 25/04; B62K 25/286; B62K 2201/08; F16F 9/435; F16F 2222/12
USPC ........................................................ 280/283
See application file for complete search history.

(56) References Cited

FOREIGN PATENT DOCUMENTS

| DE | 102007056313 A1 | 5/2009 | |
|----|----|----|----|
| EP | 2404818 A1 | 1/2012 | |
| EP | 2450591 A2 * | 5/2012 | ............. B60G 17/08 |
| EP | 2573420 A2 | 3/2013 | |

OTHER PUBLICATIONS

English language abstract of DE 102007056313.

* cited by examiner

*Primary Examiner* — Jacob D Knutson
*Assistant Examiner* — Felicia L. Brittman-Alabi
(74) *Attorney, Agent, or Firm* — Cabinet Beau de Lomenie

(57) ABSTRACT

Adjustable suspension for a bicycle, comprising a suspension body provided with a main fluid inlet and a fluid outlet, a piston disposed in the suspension body and comprising a piston head delimiting a first chamber and a second chamber, the first chamber being in fluid communication with the main fluid inlet, the piston being movable in translation in the suspension body between at least one first position in which the fluid outlet fluidly communicates with the second chamber but not with the first chamber, so as to deploy the piston, and at least one second position in which the fluid outlet is in fluid communication with the first chamber.

20 Claims, 10 Drawing Sheets

[Fig. 1]
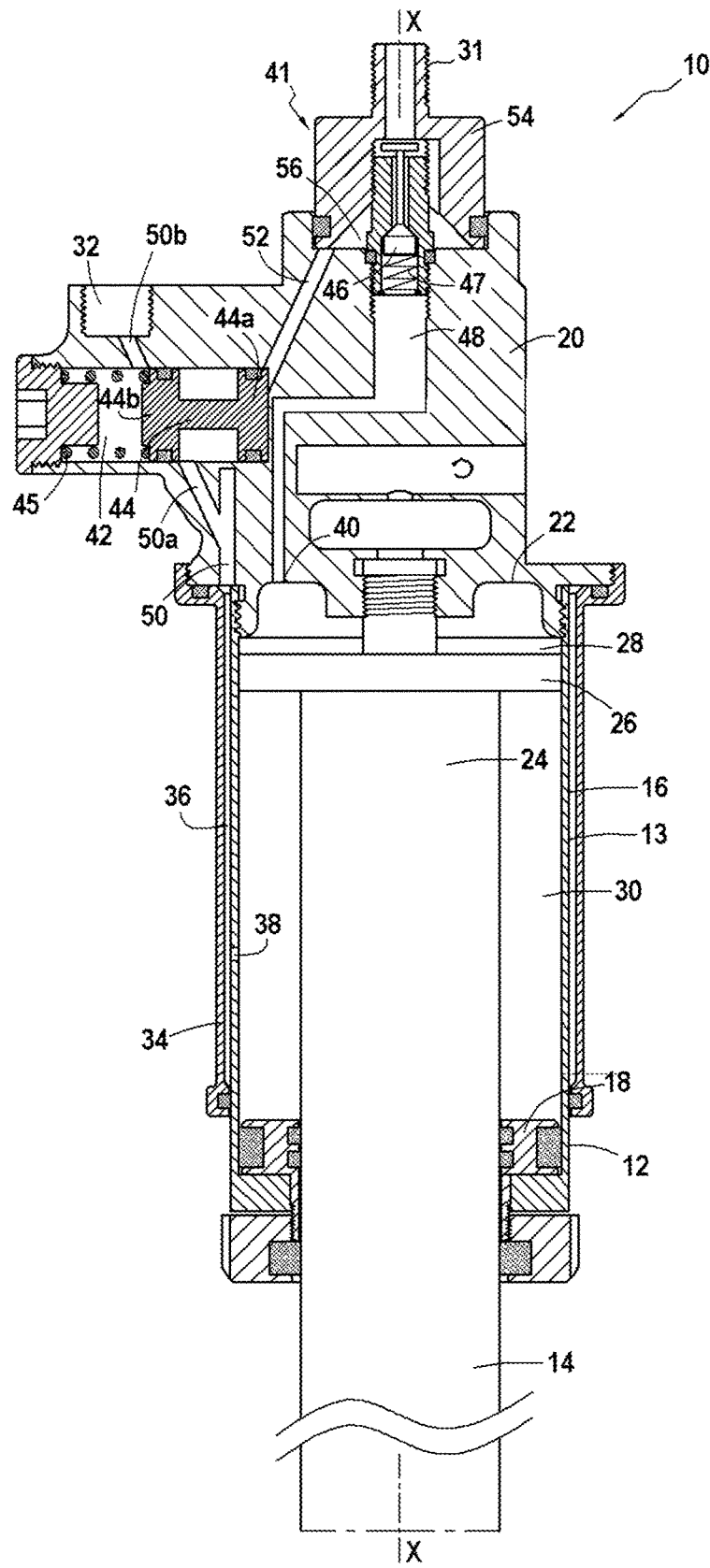

[Fig. 2]
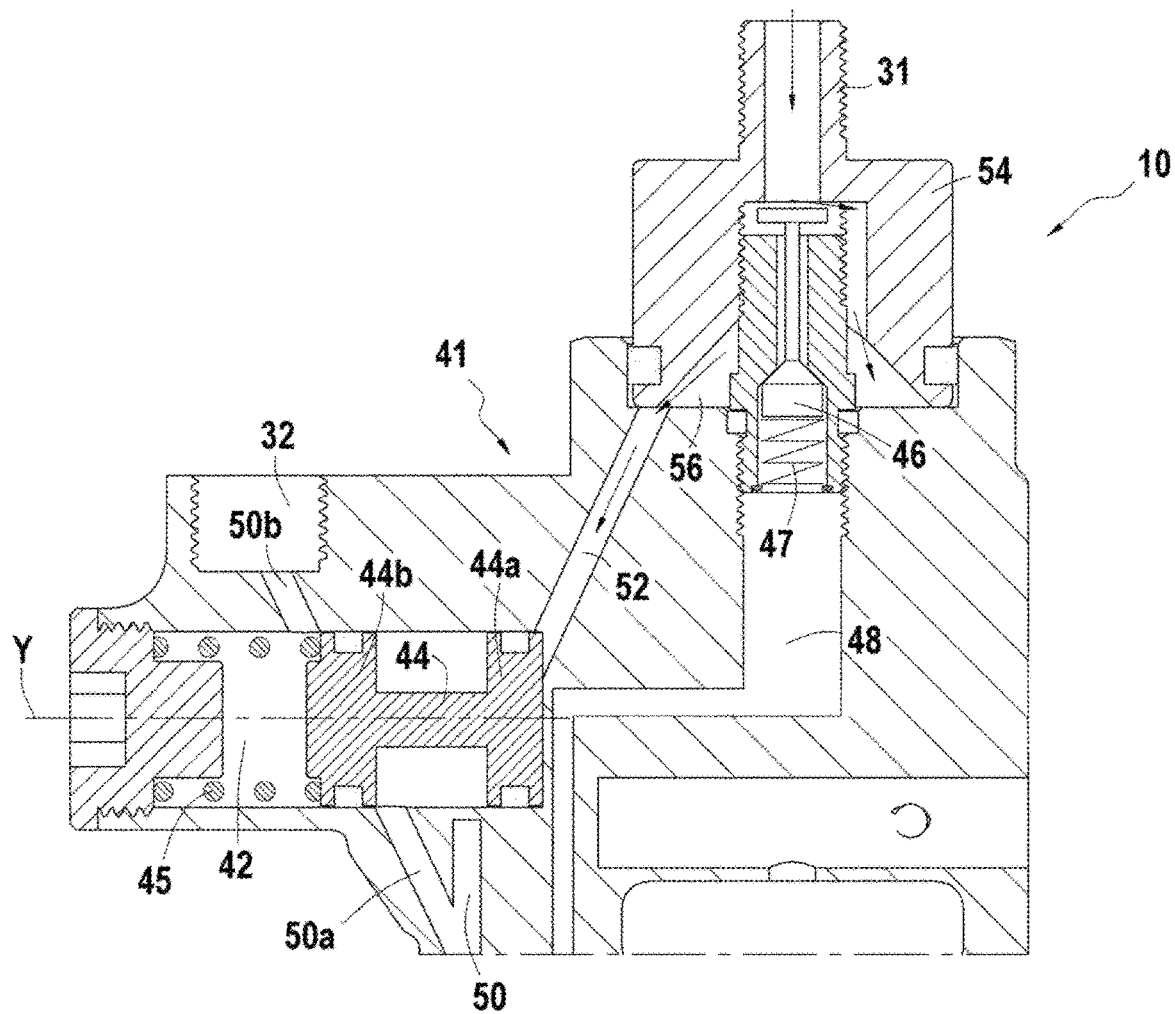

[Fig. 3]
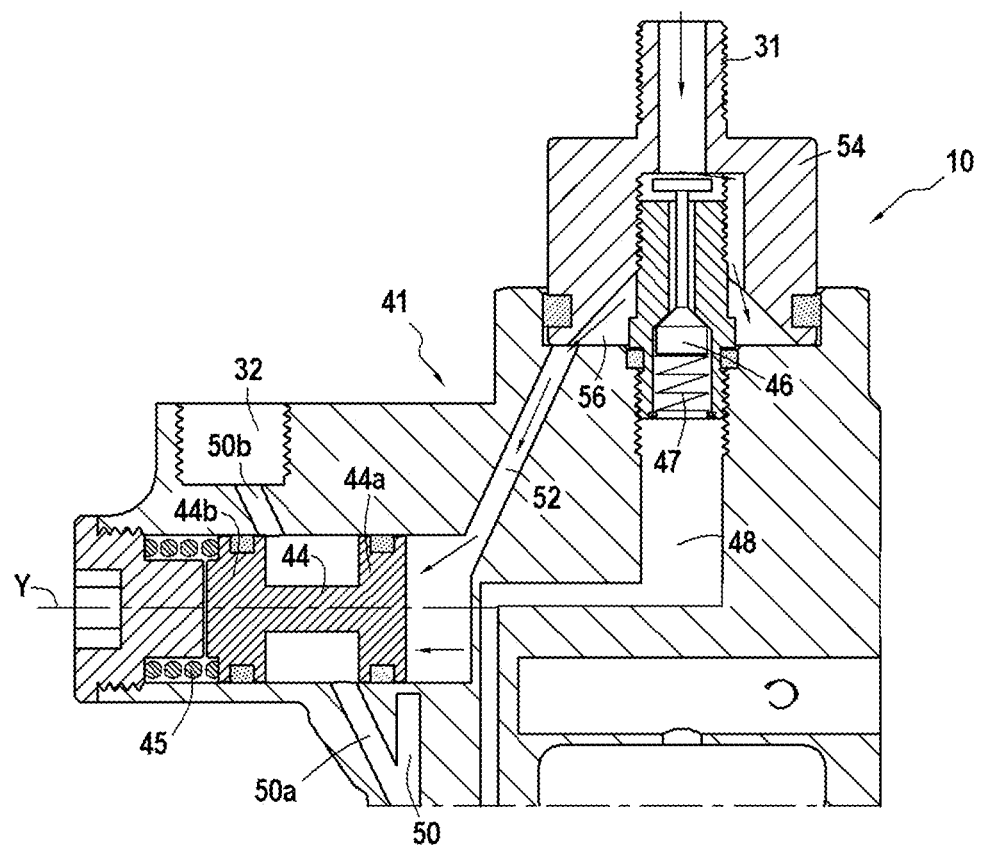

[Fig. 4]
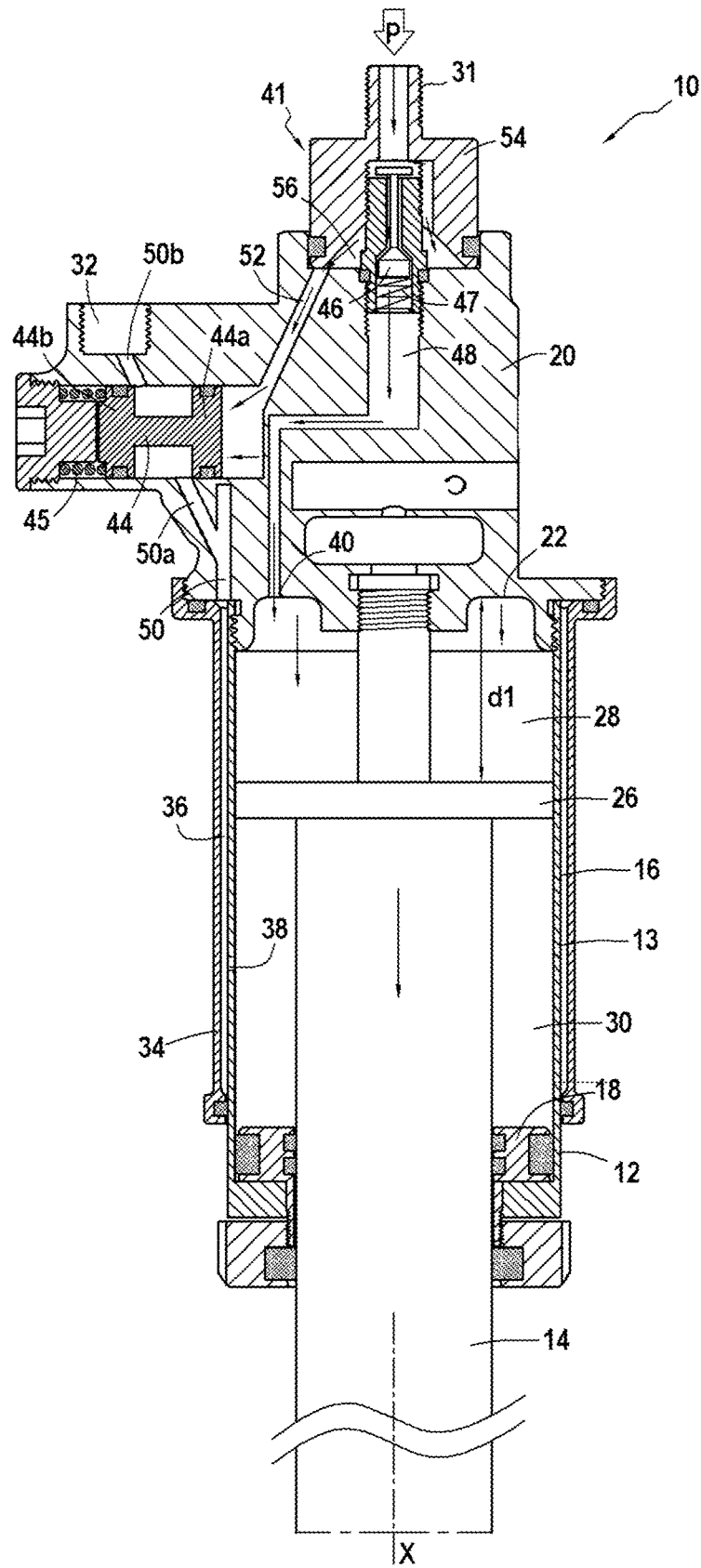

[Fig. 5]
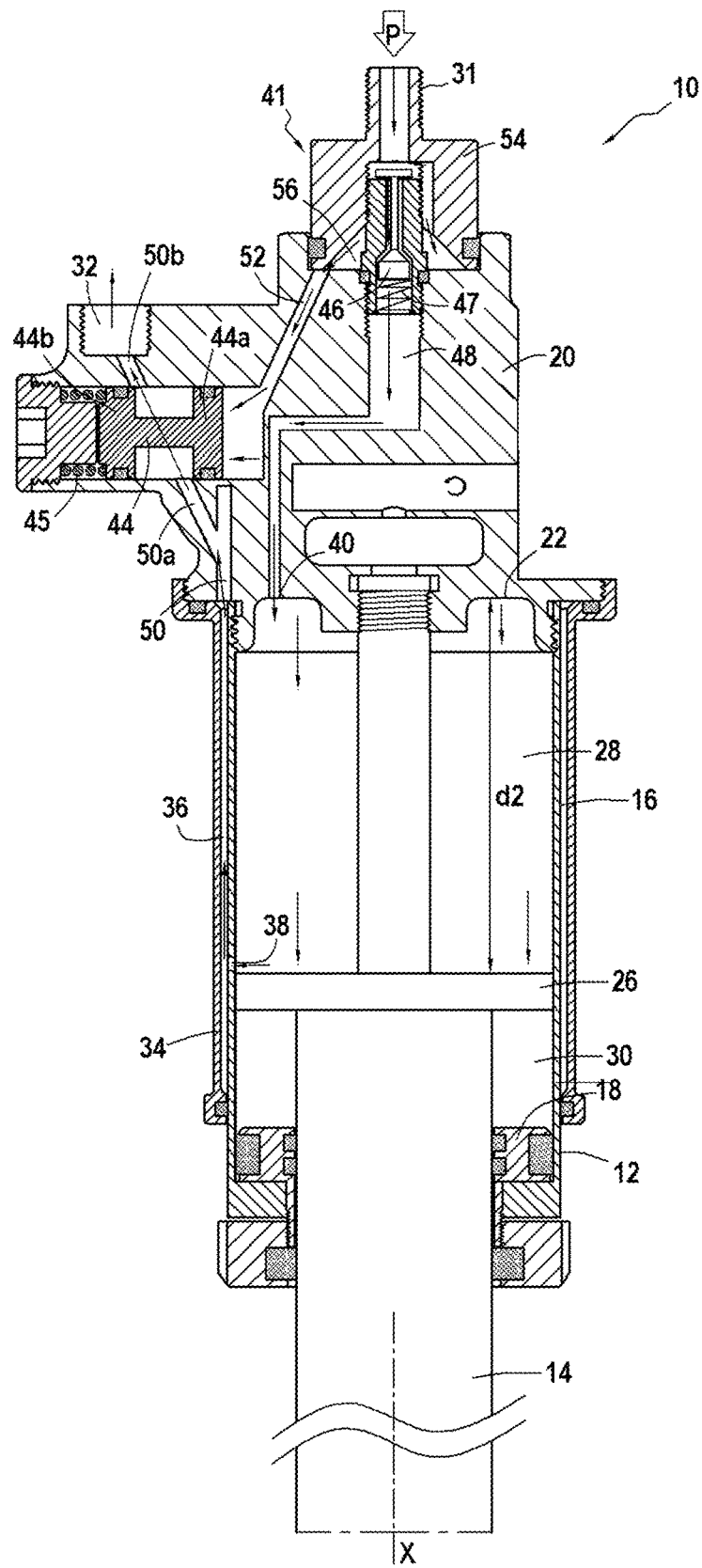

[Fig. 6]
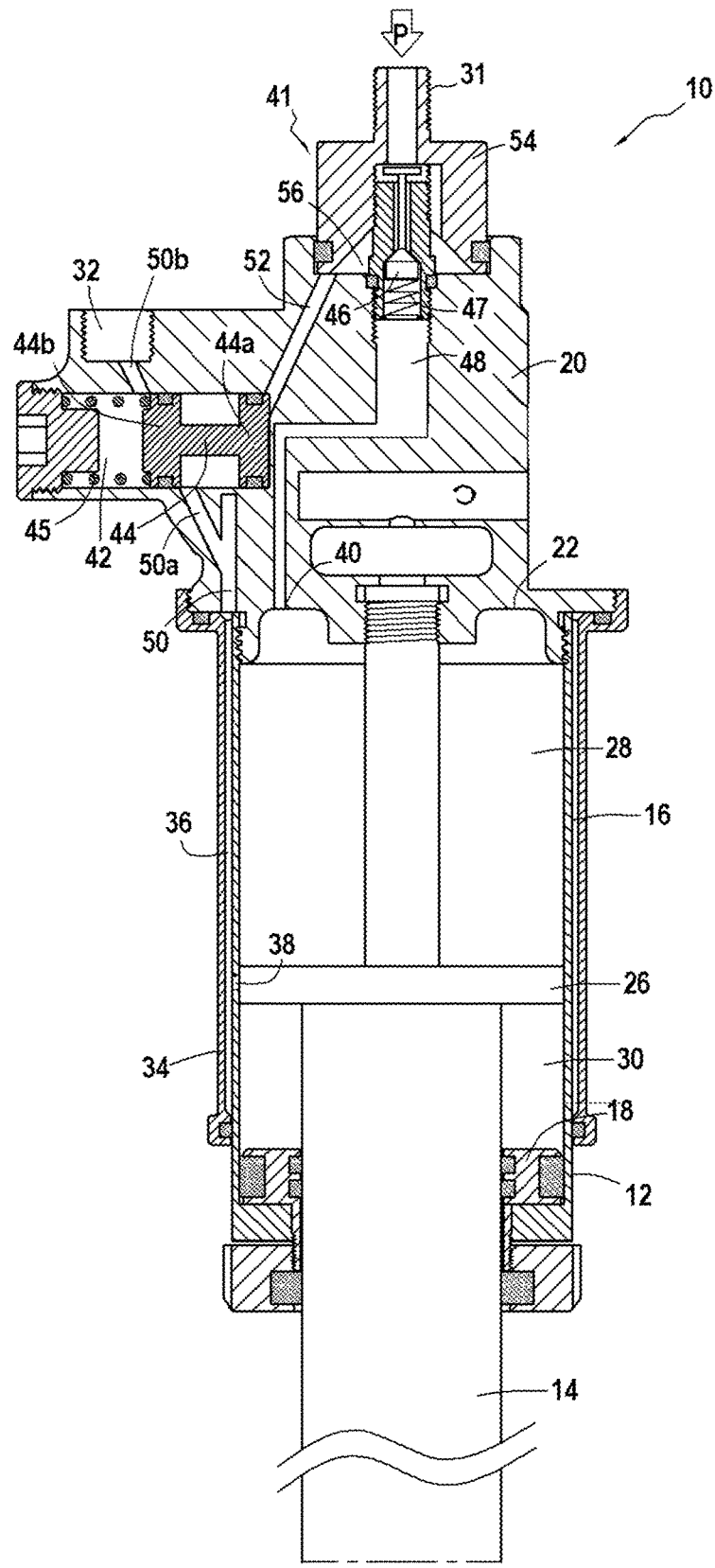

[Fig. 7]
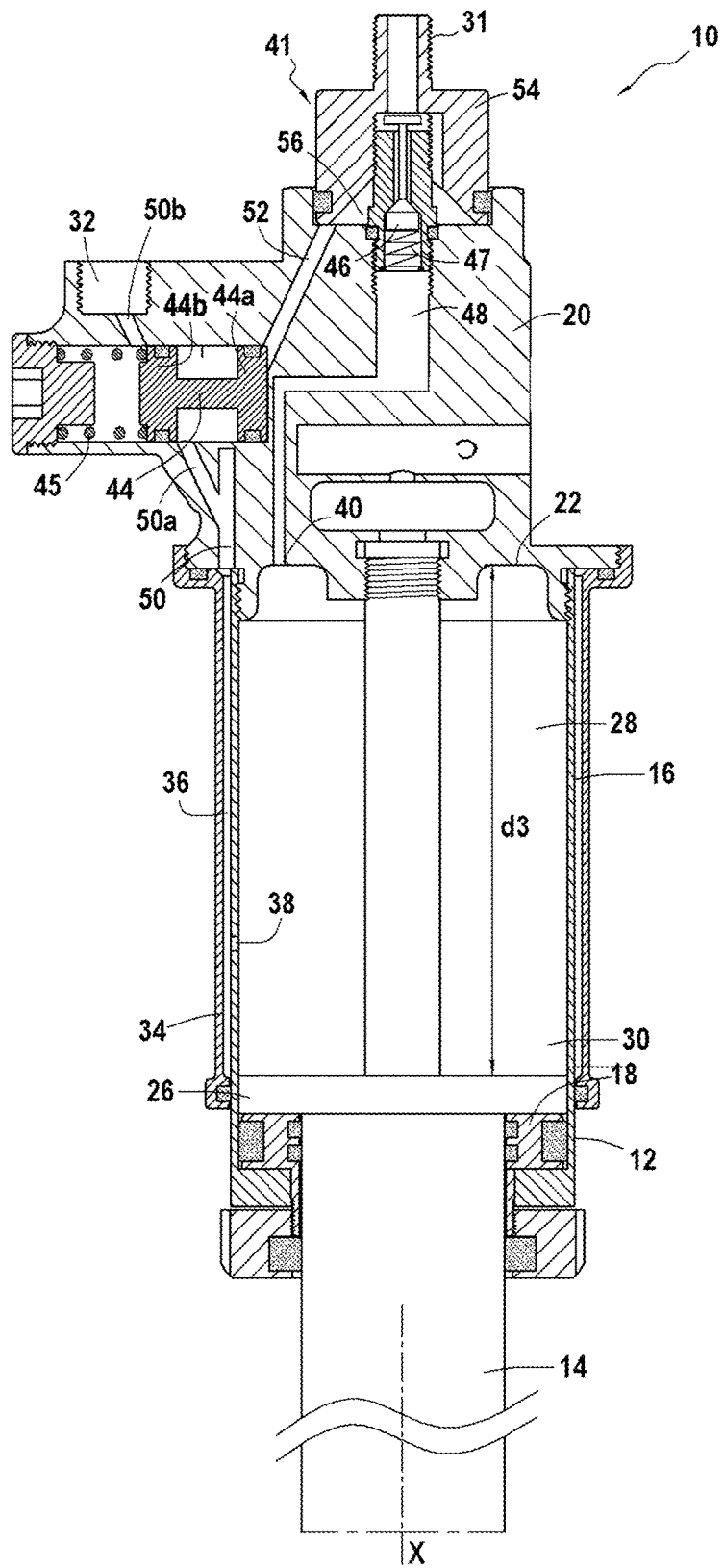

[Fig. 8]
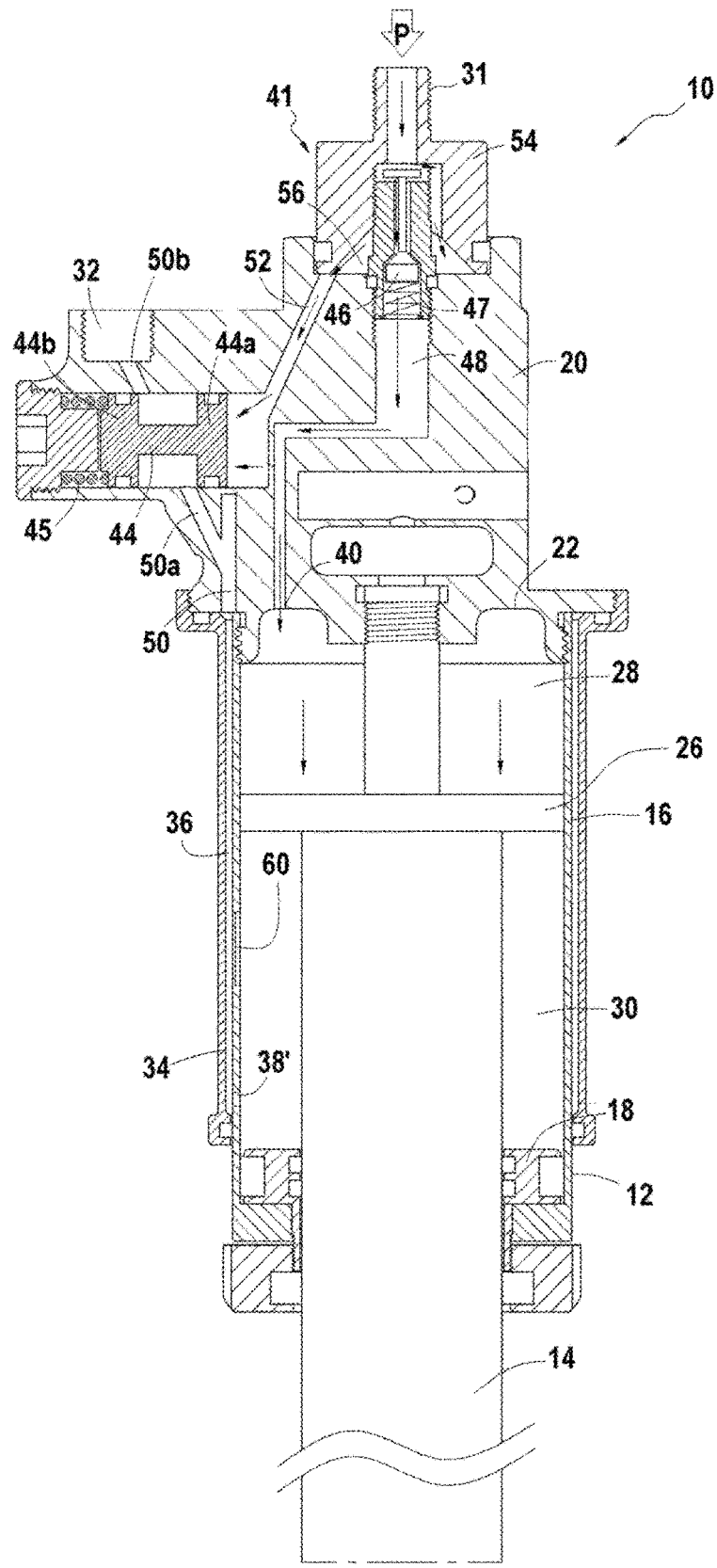

[Fig. 9]
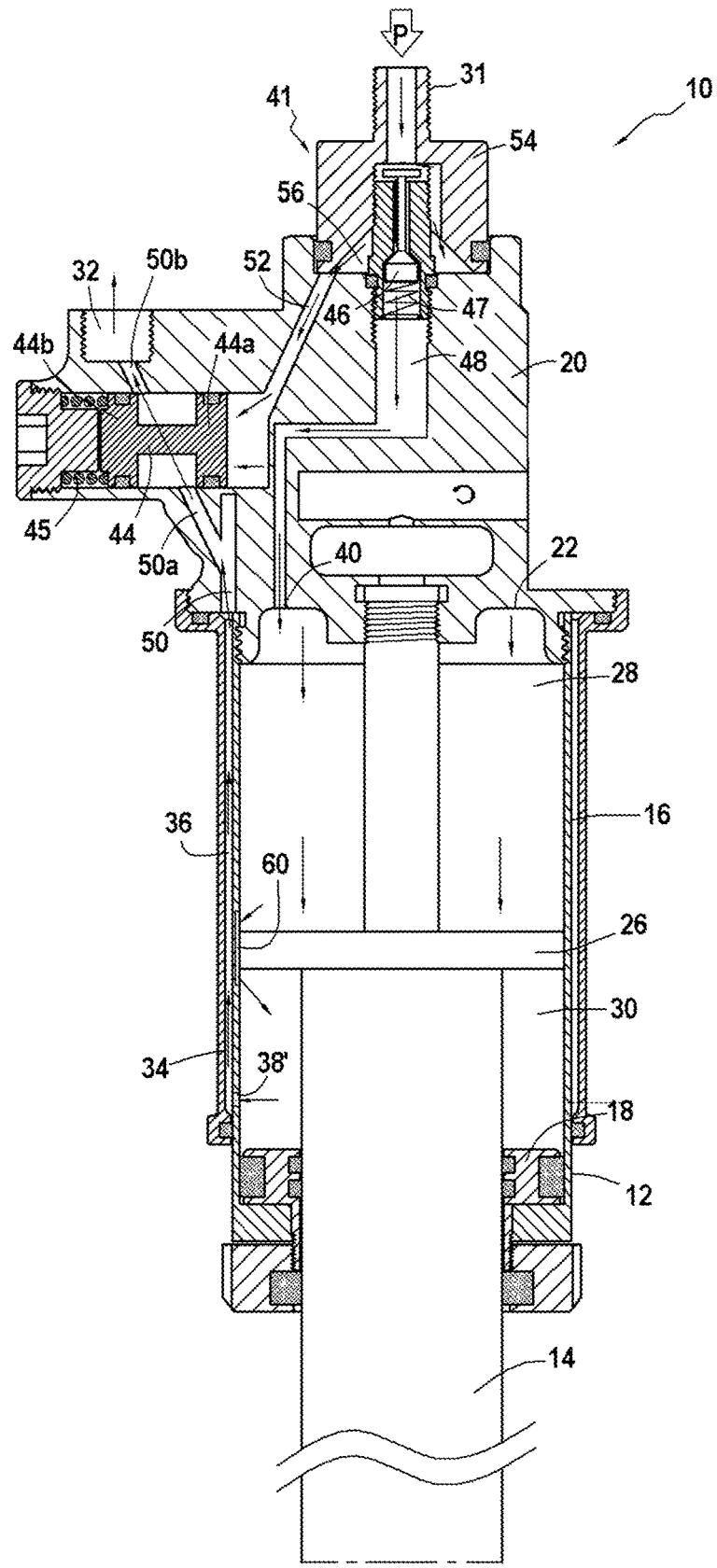

[Fig. 10]
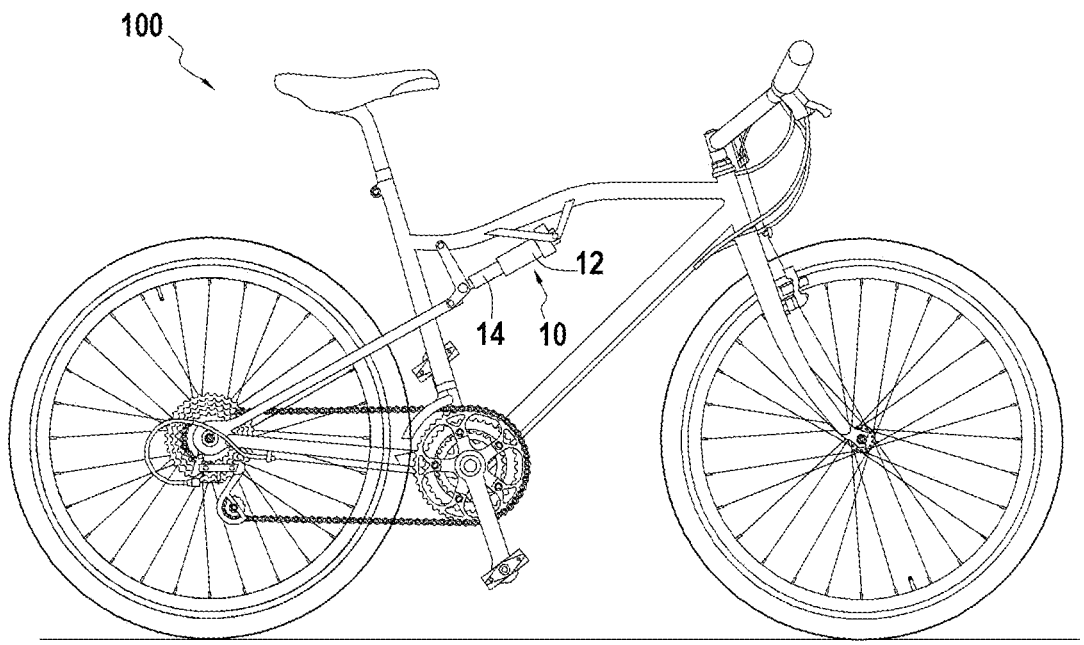

ADJUSTABLE SUSPENSION FOR A BICYCLE

TECHNICAL FIELD

The present disclosure relates to the field of adjustable bicycle suspensions and in particular suspensions whose preload can be adjusted. Such suspensions can equip a bicycle fork or shock absorber.

The preload of a suspension is also called SAG, and corresponds to the collapse of the suspension depending on the weight of the user. The preload is generally associated with a percentage of the total stroke of the suspension between a compressed position and an uncompressed position. The appropriate preload is different for each user and must therefore be adjusted before using the bicycle.

BACKGROUND

Mechanical spring bicycle suspensions, are known, in which the preload is adjusted by adjusting the load exerted on the spring at rest. A disadvantage of these suspensions is that the mechanical spring is generally very heavy and that it does not provide a sufficiently large preload adjustment range. Also, it is sometimes necessary to change the mechanical spring according to the weight of the user.

Air suspensions are also known in which the preload is adjusted by adjusting the air pressure in the suspension.

The pressure is generally adjusted manually using a manual air pump. A pressure adjustment procedure by trial and error is then carried out, in which it is generally necessary to inject air into the suspension then to eject air out of the suspension several times.

The preload adjustment procedure then involves a large and tedious repetition of steps in order to obtain the desired preload.

It is also known from document EP2573420 a suspension comprising a first chamber, a secondary chamber and a movable control element allowing to alternately communicate the first chamber with the secondary chamber and the secondary chamber with the outside of the suspension, in order to gradually reduce the pressure in the first chamber.

The pressure in the first chamber is therefore initially brought to an excessive value then is reduced manually and by trial and error by the user, until reaching a preload which seems suitable to him.

A disadvantage of this suspension is that the user must estimate himself when the preload seems satisfactory to him and that he is not guided in this adjustment. He cannot therefore adjust the preload to a value adapted to his own weight. Adjusting the preload is particularly long, difficult and imprecise.

Furthermore, if the pressure in the first chamber becomes insufficient, the user must again inject air into the suspension and repeat the actions of manual adjustment of the preload, which is very restrictive.

SUMMARY

A purpose of the present disclosure is to provide an adjustable suspension for a bicycle overcoming the aforementioned problems.

For this purpose, the disclosure relates to an adjustable suspension for a bicycle, comprising:
- a suspension body provided with a main fluid inlet configured to inject a fluid into the suspension body, and with a fluid outlet;
- a piston disposed in the suspension body and comprising a piston head delimiting a first chamber and a second chamber inside said suspension body, the first chamber being in fluid communication with the main fluid inlet, the piston being movable in translation in the suspension body between:
  - at least one first position in which the fluid outlet fluidly communicates with the second chamber but not with the first chamber, so as to deploy the piston, and
  - at least one second position in which the fluid outlet is in fluid communication with the first chamber so that the fluid injected through the main fluid inlet is guided to the fluid outlet, in order to evacuate the injected fluid from the suspension.

Without departing from the scope of the disclosure, the suspension may be a bicycle front suspension or rear suspension. Without limitation, it may be a pneumatic and/or hydraulic suspension.

The main fluid inlet can be connected to a pump or to a fluid cartridge, in order to inject the fluid into the suspension. The fluid outlet opens out of the adjustable suspension. The main fluid inlet communicates with the first chamber when the piston is in the first position and when it is in the second position.

The suspension body advantageously comprises a first bottom defining with the piston head said second chamber. The suspension body advantageously comprises a second bottom defining with the piston head said first chamber. Alternatively and without limitation, the second bottom can be formed by a separate element connected to the suspension body.

The displacement in translation of the piston in the suspension body has the effect of modifying the volume of the first chamber and of the second chamber.

To adjust the preload of the suspension, the user gets on the bicycle, so as to exert his weight on the suspension in order to compress it and at least partially extract the fluid therefrom. The piston is displaced to the second bottom and is placed in the first position.

Without limitation, in the first position, the first chamber can be completely emptied of fluid or still contain a small amount of fluid.

The user then injects fluid, for example air, gas or liquid, via the main fluid inlet. The suspension is configured so that the fluid injected through the main fluid inlet is brought into the first chamber.

In this first position, the piston prevents fluid communication between the main fluid inlet and the fluid outlet. In other words, the piston opposes the passage of the fluid injected through the main fluid inlet to the fluid outlet. Furthermore, the piston, the main fluid inlet and the suspension body may be configured so that the fluid remains in the first chamber as long as the piston is in the first position.

In this first position, the first chamber and the second chamber are also not in fluid communication.

The first chamber does not empty during the injection of fluid through the main fluid inlet. An advantage is to allow adjustment of the preload only by injecting the fluid.

This fluid injection has the effect of gradually increasing the pressure in the first chamber and therefore the preload (or SAG) of the suspension. The injected fluid further exerts a force on the piston so that the latter is deployed and moves away from the second bottom of the suspension body. The fluid injected through the main fluid inlet may be maintained in the first chamber.

The piston is displaced in translation in the suspension body to a second position. The piston is then positioned so that the fluid outlet fluidly communicates with the first chamber and therefore so that the main fluid inlet and the fluid outlet are in fluid communication. The fluid injected through the main fluid inlet is therefore guided to the fluid outlet and is evacuated out of the adjustable suspension.

In the second position, if the fluid injection is continued, the injected fluid is not maintained in the first chamber. The fluid injected through the main fluid inlet while the piston is in the second position is guided directly to the fluid outlet.

The injected fluid may pass through the first chamber before being guided to the fluid outlet, so that it does not remain in the first chamber.

In this second position of the piston, the pressure in the first chamber no longer increases and remains constant despite the injection of fluid. In this second position, the preload no longer changes and is adjusted at a value adapted to the user. Furthermore, the piston remains substantially stationary.

According to the disclosure, when the piston reaches the second position, the preload is maintained at a constant value, so that its adjustment is interrupted, even if the fluid continues to be injected through the main fluid inlet. The user is therefore not required to adjust the preload by trial and error. When the piston is in the second position, the preload is adjusted precisely and the user does not need to carry out additional manual tests and adjustments. In addition, insofar as the user gets on the bicycle during the adjustment, the adjusted preload depends on his weight.

Furthermore, the disclosure allows overcoming the risk of introducing too high fluid pressure into the first chamber, which would force the user to empty the fluid present in the first chamber before injecting fluid again via the main fluid inlet.

The preload of the adjustable suspension according to the disclosure can therefore be adjusted quickly and precisely.

The user can then interrupt the fluid injection and close the main fluid inlet and the fluid outlet. The user then gets off the bicycle, so that he no longer exerts his weight on the suspension. Then the suspension is no longer constrained by the weight of the user. Due to the pressure of the fluid present in the main chamber, a force is exerted on the piston, tending to further deploy the piston by moving it away from the second bottom. The piston is brought into a third position, forming a rest position, in which said piston is substantially fully deployed.

Therefore, when the user gets on the bicycle, the piston is translated from the third position to the second position and the stroke of the piston between these third and second positions corresponds to the preload previously adjusted.

Advantageously, the volume of the first chamber when the piston is in the first position is less than the volume of the first chamber when the piston is in the second position. The suspension is adjusted by injecting fluid, gradually increasing the volume of the first fluid chamber to move the piston from the first position to the second position. Also, there is no need to inject an excessive amount of fluid then gradually release fluid until the desired preload is reached. An advantage is to limit the amount of fluid consumed.

According to a particularly advantageous aspect of the disclosure, the piston is configured to move from the first position to the second position when fluid is injected through the main fluid inlet. The fluid injected into the first chamber moves the piston from the first position to the second position automatically, without additional user intervention. An advantage is to dispense with a step of manual adjustment of the preload. The user can adjust the SAG to the appropriate value only by injecting the fluid, so the adjustment of the preload is facilitated. The passage from the first position to the second position is automatically performed by injecting the fluid through the main fluid inlet. In particular, there is no need to inject an excessive amount of fluid then open an exhaust valve to release the fluid.

Thanks to the disclosure, the preload adjustment is therefore particularly quick. Furthermore, the SAG is precisely adjusted and maintained at the appropriate value.

The suspension body may comprise an injection orifice fluidly communicating with the main fluid inlet and opening into the first chamber, and an evacuation orifice fluidly communicating with the fluid outlet and opening into the suspension body.

Regardless of the position of the piston, the fluid injected through the main fluid inlet is brought into the first chamber via the injection orifice.

In the second position, the first chamber is in fluid communication with the evacuation orifice. The fluid injected through the main fluid inlet via the injection orifice then passes through the evacuation orifice and is guided to the fluid outlet, so as to escape from the suspension.

Advantageously, the piston is movable in a direction of displacement and the evacuation orifice and the injection orifice are disposed in distant positions considered in said direction of displacement. The piston consequently describes a relative translational movement relative to the evacuation orifice.

The evacuation orifice may be disposed in a lower portion of the suspension body while the injection orifice is disposed in an upper portion of the suspension body.

In the first position, the piston head advantageously extends between the injection orifice and the evacuation orifice.

The evacuation orifice and/or the injection orifice may be formed in a side wall of the suspension body. Alternatively, the injection orifice may be formed in the first bottom of the suspension body or the second bottom of the suspension body, and may be formed by an element connected to the suspension body.

Advantageously, said evacuation orifice opens into an evacuation chamber fluidly communicating with the fluid outlet. The evacuation chamber may comprise a conduit extending between the evacuation orifice and the fluid outlet. This evacuation chamber allows bringing the fluid leaving the suspension body to the fluid outlet.

According to a first advantageous variant, the evacuation orifice is configured so as to open into the second chamber when the piston is in the first position and so as to open into the first chamber when the piston is in the second position.

When the piston is in the first position, the piston head extends between the injection orifice and the evacuation orifice. Then it forms in the suspension body a hermetic plug preventing the passage of the fluid from the first chamber to the evacuation orifice, so that the injected fluid is maintained in the first chamber.

When moving from the first position to the second position, the piston head passes beyond said evacuation orifice so that the evacuation orifice is then between the piston head and the injection orifice and therefore leads into the first chamber.

In the second position, the main fluid inlet, the first chamber, the evacuation orifice and the fluid outlet are in fluid communication, so that the fluid injected through the main fluid inlet is guided to the fluid outlet.

According to a second advantageous variant, the evacuation orifice opens into the second chamber and the piston head extends between the evacuation orifice and the injection orifice when the piston is in the second position. The evacuation orifice opens into the second chamber regardless of the position of the piston.

In the first position of the piston, the piston head forms a hermetic plug inside the suspension body, preventing the passage of the fluid between the first chamber and the second chamber and therefore between the main fluid inlet and the fluid outlet.

The adjustable suspension may comprise a bypass channel configured to fluidly communicate the first and second chambers when the piston is in the second position. An advantage is to fluidly communicate the first chamber and the second chamber and therefore the main fluid inlet and the fluid outlet, when the piston is in the second position. Another advantage is to balance the pressures between the first chamber and the second chamber.

Without limitation, the bypass channel can be formed in the suspension body or in the piston.

Advantageously, the suspension body comprises an inner wall and the bypass channel is formed in said inner wall, the piston head being positioned at the bypass channel when the piston is in the second position, so that, in this second position, the first and second chambers are in fluid communication.

The piston head advantageously has a thickness considered in the direction of displacement of the piston. Likewise, the bypass channel advantageously has a length considered in said direction of displacement of the piston. The length of the bypass channel may be greater than the thickness of the piston head.

Also, when the piston is in the second position and therefore when the piston head is disposed at the bypass channel, said bypass channel opens into the suspension body, on either side of the piston head, respectively in the first chamber and in the second chamber. Said bypass channel then forms a passage allowing the fluid to bypass the piston and pass from the first chamber to the second chamber, in order to be guided to the fluid outlet. The main fluid inlet and the fluid outlet are therefore fluidly communicated.

When the piston is in the first position, the bypass channel extends into the second chamber so that it does not allow fluid communication between the first chamber and the second chamber.

Considered in the direction of displacement of the piston, the bypass channel may extend between the evacuation orifice and the injection orifice.

Advantageously, the adjustable suspension further comprises a valve device which can assume a first state in which it prevents fluid from escaping from the suspension, and a second state in which it allows the extraction of the fluid from the suspension.

It is understood that the valve device is placed in the second state when adjusting the preload, in order to allow the evacuation of the fluid when the piston is in the second position. The valve device is advantageously placed in the first state when adjusting the preload, so that this first state corresponds to a normal operating state of the suspension, apart from adjustment. In this first state, the fluid device allows maintaining the fluid in the suspension so that the preload remains substantially constant and adjusted to a value adapted to the user.

Preferably, the valve device comprises an inlet valve disposed at the main fluid inlet and an outlet valve disposed at the fluid outlet, said inlet and outlet valves being configured to open when the valve device is in the second state and to close when the valve device is in the first state.

Without departing from the scope of the disclosure, the inlet valve can be positioned in the proximity of the main fluid inlet. Without limitation, it can be disposed in an injection channel communicating with the main fluid inlet and with the first chamber.

When the valve device is placed in the second state, both the inlet and outlet valves are open. The opening of the inlet and outlet valves can be simultaneous or successive. The fluid can then be injected and can escape from the suspension. When the valve device is in the first state, the inlet and outlet valves effectively prevent fluid from escaping from the suspension via the main fluid inlet and via the fluid outlet. The preload is maintained more effectively at the adjusted value.

Advantageously, the valve device is configured to be brought into the second state when a fluid is injected through the main fluid inlet and to be brought into the first state when the fluid injection is interrupted.

An advantage is that the user is not required to manually bring the valve device in the second state when he wishes to adjust the preload. Furthermore, the user is also not required to manually bring the valve device in the first state when the preload is adjusted. In addition, this conformation allows overcoming the risk of forgetting to return the valve device to the first state, which would adversely affect the operation of the suspension.

The disclosure also relates to a method for adjusting an adjustable suspension as described above, comprising the following steps:

the first chamber is fluidly communicated with the atmosphere;

the suspension is compressed so as to evacuate the fluid from the first chamber and place the piston in the first position; and the fluid is injected into the first chamber through the main fluid inlet of the suspension body so as to displace the piston to its second position, in which the fluid injected through the main fluid inlet is guided to the fluid outlet; and the fluid injection is interrupted and the main fluid inlet and the fluid outlet are closed so that the fluid remains in the suspension The disclosure moreover relates to a bicycle including at least one adjustable suspension as described above.

BRIEF DESCRIPTION OF THE DRAWINGS

FIG. 1 is a sectional view of a first embodiment of the adjustable suspension according to the disclosure;

FIG. 2 illustrates a fluid distribution device of the adjustable suspension of FIG. 1, in which the outlet valve is closed;

FIG. 3 illustrates the fluid distribution device of the adjustable suspension of FIG. 1, in which the outlet valve is open;

FIG. 4 illustrates the adjustable suspension of FIG. 1, the piston being in a first position;

FIG. 5 illustrates the adjustable suspension of FIG. 1, the piston being in a second position;

FIG. 6 illustrates the adjustable suspension of FIG. 5 after interruption of the fluid injection;

FIG. 7 illustrates the adjustable suspension of FIG. 1, the piston being placed in a third position;

FIG. 8 is a sectional view of a second embodiment of the adjustable suspension according to the disclosure, the piston being placed in a first position;

FIG. 9 illustrates the adjustable suspension of FIG. 8, the piston being placed in a second position; and FIG. 10 illustrates a bicycle provided with an adjustable suspension according to the disclosure.

DETAILED DESCRIPTION

The disclosure relates to an adjustable suspension of a bicycle, the preload of which can be easily adjusted, depending on the weight of the user.

FIG. 1 illustrates an adjustable suspension 10 in accordance with the present disclosure.

The adjustable suspension 10 forms, in this non-limiting example, a rear bicycle suspension. It comprises a suspension body 12 and a piston 14 disposed in the suspension body.

The suspension body 12 comprises a main cylinder 13 delimiting a main chamber. It comprises a side wall 16 a first bottom 18 in the lower portion of the suspension body. The suspension body 12 further comprises a fluid distribution device 20, secured to the main cylinder 13 and delimiting a second bottom 22 in the upper portion of said suspension body.

In this FIG. 1, it can be seen that the piston 14 comprises a piston rod 24 and a piston head 26 secured to the piston rod. It is noted that the piston 14 is disposed inside the main cylinder 13 of the suspension body 12 and delimits with the second bottom 22 a first chamber 28 inside said suspension body 12. The piston head 26 further delimits a second chamber 30 with the first bottom 18, inside the suspension body 12. The piston head 26 extends in a direction of displacement X in the suspension body, so that the piston 14 is slidably mounted in this direction of displacement X inside the suspension body 12.

The fluid distribution device 20 is secured to the main cylinder. In this non-limiting example, the fluid distribution device and the main cylinder 13 form two separate parts, the fluid distribution device being secured in an upper portion of the cylinder. Alternatively, the suspension body can form a one-piece assembly.

The suspension body 12 comprises a main fluid inlet 31 disposed in the upper portion of said suspension body. The suspension body also comprises a fluid outlet 32 disposed on the fluid distribution device 20. The fluid outlet 32 opens out of the adjustable suspension 10.

The adjustable suspension 10 moreover comprises a secondary cylinder 34, inside which extends the main cylinder 13 and defining with the side wall 16 an evacuation chamber 36. The evacuation chamber 36 is in fluid communication with the fluid outlet 32.

The suspension body comprises an evacuation orifice 38 formed in the side wall 16 of said suspension body 12, so that said evacuation orifice 38 opens inside the main cylinder 13 of the suspension body and into the evacuation chamber 36. The evacuation orifice 38 is in fluid communication with the fluid outlet 32.

The suspension body 12 moreover comprises an injection orifice 40, formed in the fluid distribution device 20 and opening into the first chamber 28 of the suspension body 12.

The injection orifice 40 is in fluid communication with the main fluid inlet 31.

The fluid distribution device 20 comprises a cylindrical valve cavity 42, formed in said fluid distribution device 20. The fluid distribution device moreover comprises an injection channel 48, an evacuation channel 50 and a valve channel 52.

The injection channel 48 is formed in the fluid distribution device 20. It opens into the first chamber 28 via the injection orifice 40. In this non-limiting example, the injection channel 48 comprises three channel segments.

The fluid distribution device 20 further comprises a valve device 41 comprising an inlet valve 46, forming a check valve, provided with a spring. The inlet valve 46 is slidably mounted in the injection channel at the main fluid inlet 31. The inlet valve 46 can assume a closed position, illustrated in FIG. 1, in which it prevents a fluid from penetrating or escaping from the injection channel 48 and therefore from the first chamber 28 and an open position in which it allows introducing a fluid into the injection channel 48 and into the first chamber 28. The first spring 47 tends to bring the inlet valve 46 into the closed position. The inlet valve is further configured to open and allow the entry of the fluid into the first chamber 28 when the pressure of said fluid upstream of said check valve is greater than a predetermined pressure threshold.

The evacuation channel 50 is in fluid communication with the evacuation chamber 36 and with the outside of the suspension. The evacuation channel passes through the valve cavity 42, so that it comprises a first evacuation channel portion 50a opening into the evacuation chamber 36 and into the valve cavity 42 and a second evacuation channel portion 50b opening into the valve cavity 42 and out of the suspension.

The valve device 41 comprises an outlet valve 44 provided with a second spring 45 and slidably mounted in the valve cavity 42, along a sliding axis Y. The outlet valve 44 comprises a first cylindrical valve portion 44a and a second cylindrical valve portion 44b. The outlet valve 44 can assume a closed position, illustrated in FIG. 1, in which it prevents a fluid from escaping from the suspension body 12 and from the suspension 10, and an open position in which it allows the fluid to escape from the suspension body 12 and from the suspension 10. The second spring 45 tends to bring the outlet valve into the closed position. The outlet valve 44 is further configured to open when the pressure of said fluid upstream of said outlet valve is greater than a predetermined pressure threshold.

In this non-limiting example, the suspension body 12 further comprises a removable plug 54 mounted at the upper end of the fluid distribution device 20 and in which the main fluid inlet 31 is formed. An inner housing 56 is provided in this removable plug 54. The valve channel 52 opens on the one hand into the valve cavity 42 and on the other hand into the inner housing 56 of the plug 54.

The steps of adjusting the preload of the adjustable suspension 10 described above will be detailed using FIGS. 1 to 7.

Firstly, the first chamber 28 is substantially emptied of fluid, for example by removing the removable plug 54. The user then gets on the bicycle, so as to compress the adjustable suspension.

As long as no fluid is injected, the valve device 41 is placed in a first state, in which the inlet valve 46 and the outlet valve 44 are closed, as illustrated in FIG. 2. In the closed position, the outlet valve obstructs the valve channel 52. Furthermore, in the closed position, the outlet valve 44 is disposed so that the first evacuation channel portion 50a and the second evacuation channel portion 50b open on either side of said second cylindrical valve portion 44b. The second cylindrical valve portion 44b forms a shutter in the valve cavity 42 preventing the fluid coming from the first evacuation channel portion 50a from being brought into the second evacuation channel portion 50b and therefore from escaping from the suspension.

In this non-limiting example, the user then connects the removable plug 54 to the suspension.

The user then injects a fluid, for example a gas such as carbon dioxide, through the main fluid inlet 31 disposed on the removable plug 54, as illustrated in FIG. 2. The fluid can be contained in a cartridge. Alternatively, the user can connect a pump to the main fluid inlet. The circulation of the fluid is illustrated by arrows. The fluid then penetrates into the housing 56 of the removable plug. The pressure of the injected fluid, upstream of the inlet valve 46 of the valve device 41, is insufficient to allow the opening of the inlet valve 46 and therefore the entry of the fluid into the main chamber 28. The fluid is guided by the valve channel 52 to the valve cavity 42.

The valve device being in a first state, the outlet valve is closed. The fluid injection has the consequence of displacing the outlet valve 44 along the sliding axis Y, to the open position illustrated in FIG. 3. The fluid injection allows maintaining the outlet valve 44 in the open position.

In this open position, the second spring 45 is compressed. The first evacuation channel portion 50a and the second evacuation channel portion 50b open on the same side of the second cylindrical valve portion 44b and are therefore in fluid communication.

The fluid injection is continued so that the pressure within the valve channel 52 and the housing 56 formed in the removable plug 54 increases gradually. When the pressure in the valve channel 52, in the housing 56 and therefore upstream of the inlet valve 46 becomes greater than the predetermined pressure threshold for opening said inlet valve 46, the latter opens and allows the fluid to enter into the injection channel 48 then into the first chamber 28. This step is illustrated in FIG. 4. The inlet and outlet valves 46, 44 are then opened. The valve device 41 is therefore automatically brought into a second state by injecting fluid via the main fluid inlet 28. In this second state, the valve device 41 allows the extraction of the fluid from the suspension.

The pressure in the first chamber 28 increases due to the fluid penetrating therein.

FIG. 4 illustrates the piston in a first position, in which the piston head 26 is disposed at a distance d1 from the second bottom 22 of the suspension body 12. Furthermore, the evacuation orifice 38 opens into the second chamber 30, so that the fluid outlet 32 fluidly communicates with the second chamber 30 but not with the first chamber 28. Also, the fluid injected through the main fluid inlet 31 in the first chamber 28 exerts a force on the head of the piston 26, oriented in the direction of displacement, in a direction opposite to the main fluid inlet 31. The piston 14 is displaced in the suspension body 12 in said direction, in the direction of displacement X and is deployed. The volume of the first chamber increases. The distance between the second bottom 22 of the suspension body 12 and the piston head 26 increases. Also, the volume of the first chamber 28 increases.

As can be seen from the passage from FIG. 4 to FIG. 5, the piston 14 is displaced, until the piston head 26 passes beyond the evacuation orifice 38. Consequently, the evacuation orifice 38 no longer opens into the second chamber 30 but into the first chamber 28. The piston 14 is then placed in a second position in which the piston head 26 and the second bottom 22 of the suspension body are separated by a distance d2 greater than the initial distance d1.

According to the disclosure, the piston 14 therefore automatically moves from the first position to the second position, by continuous injection of fluid through the main fluid inlet 31.

In this second position of the piston 14, illustrated in FIG. 5, the fluid outlet 32 is in fluid communication with the first chamber 28. The fluid injected through the main fluid inlet 31 is brought into the first chamber 28 then into the evacuation chamber via the evacuation orifice. The fluid is then brought into the first evacuation channel portion 50a, into the valve cavity 42 then into the second evacuation channel portion 50b and is finally guided out of the adjustable suspension 10 via the fluid outlet 32.

In this second position of the piston 14, the main fluid inlet 31 is in fluid communication with the fluid outlet 32 so that the injected fluid is evacuated from the adjustable suspension 10 through said fluid outlet. Consequently, the pressure within the first chamber 28 no longer increases and the piston 24 is no longer displaced in the suspension body 12, despite the injection of the fluid.

The preload of the suspension is then adjusted and no longer changes, despite the continuation of the injection of fluid through the main fluid inlet 31. Also, according to the disclosure, the preload is adjusted very easily, by injecting the fluid continuously through the main fluid inlet 28. The user is not required to adjust the preload manually, for example by trial and error.

Insofar as the user is placed on the bicycle during the adjustment, the second position of the piston 14 is conditioned by the weight of the user. Also, the preload, or SAG, is adjusted according to the weight of the user.

As illustrated in FIG. 6, the user then interrupts the injection of fluid, which no longer exerts any force on the inlet and outlet valves. The first spring 47 brings the inlet valve to the closed position and the second spring 45 brings the outlet valve to the closed position. The interruption of the fluid injection therefore automatically brings the valve device 41 to the first state in which it prevents the fluid from escaping from the suspension.

Furthermore, the pressure in the first chamber slightly decreases so that the piston is slightly displaced towards the main fluid inlet. The evacuation orifice 38 is then disposed at the piston head 26 and no longer opens into the first chamber 28. The piston head 26 obstructs the evacuation orifice so that the fluid does not escape from the first chamber.

The user can then get off the bicycle. Due to the pressure exerted by the fluid present within the first chamber 28 and to the removal of the weight of the user, the piston 14 is further deployed to a third position, which corresponds to a rest position of the adjustable suspension.

In this third position, illustrated in FIG. 7, the piston head 26 and the second bottom 22 of the suspension body 12 are separated by a distance d3 greater than the initial distance d1 and the distance d2. The stroke of the piston 14 between these second and third positions corresponds to the preload previously adjusted. In this non-limiting example, the piston head 26 is substantially in contact with the first bottom 18. Without departing from the scope of the disclosure, in the third position, an amount of fluid may remain in the second chamber 30; so that the volume of the second chamber is not zero and that the piston head is maintained at a distance from the first bottom.

The user can then detach the removable plug 54 from the suspension body 12, which has the consequence of fluidly communicating the valve channel 52 with the atmosphere. An advantage is to empty the fluid possibly present in the valve channel 52. The inlet valve 46, which is closed, maintains the fluid present in the first chamber 28. The size and the weight of the suspension are therefore reduced by removing the removable plug 56.

FIG. 8 illustrates a second embodiment of the adjustable suspension according to the disclosure. In this second embodiment, the evacuation orifice 38' is disposed in the proximity of the first bottom 18. The suspension body further comprises a bypass channel 60 formed in its side wall 16. Considered according to the direction of displacement X of the piston 14, the bypass channel 60 has a length greater than the thickness of the piston head, also considered in this direction.

When the piston 14 is in the first position and in the second position, the evacuation orifice 38' opens into the second chamber, so that the piston head extends between the evacuation orifice 38' and the injection orifice 40.

The bypass channel 60 is positioned so that when the piston 14 is in the first position, illustrated in FIG. 8, the piston head 26 extends between the injection orifice 40 and the bypass channel 60. Also, in the first position of the piston 14, the bypass channel 60 opens into the second chamber 30 but not into the first chamber 28. The consequence of the fluid injection is to deploy the piston, as in the first embodiment, up to in a second position.

When the piston 14 is in the second position, illustrated in FIG. 9, the piston head 26 is disposed at the bypass channel 60, so that said bypass channel opens into the suspension body 12, on either side of the piston head, respectively in the first chamber 28 and in the second chamber 30. Said bypass channel then forms a passage allowing the fluid to bypass the piston head 26 and to pass from the first chamber to the second chamber. The first chamber and the second chamber are then in fluid communication.

Also, as illustrated in FIG. 9, when the piston is in the second position, the fluid injected through the main fluid inlet 31 passes from the first chamber to the second chamber then is guided to the fluid outlet via the evacuation orifice 38', the evacuation chamber 36, the evacuation channel 50 and the valve cavity 42.

FIG. 10 illustrates a bicycle 100 provided with an adjustable suspension 10 according to the disclosure. In this non-limiting example, the adjustable suspension is a rear suspension of the bicycle.

The invention claimed is:

1. An adjustable suspension for a bicycle, comprising:
   a suspension body provided with a main fluid inlet configured to inject a fluid into the suspension body, and with a fluid outlet;
   a piston disposed in the suspension body and comprising a piston head delimiting a first chamber and a second chamber inside said suspension body, the first chamber being in fluid communication with the main fluid inlet, the piston being movable in translation in the suspension body between:
   at least one first position in which the fluid outlet fluidly communicates with the second chamber but not with the first chamber, so as to deploy the piston, and
   at least one second position in which the fluid outlet is in fluid communication with the first chamber so that the fluid injected through the main fluid inlet is guided to the fluid outlet, in order to evacuate the injected fluid from the suspension, the piston being configured to move from the first position to the second position when fluid is injected through the main fluid inlet.

2. The adjustable suspension according to claim 1, wherein the volume of the first chamber, when the piston is in the first position, is less than the volume of the first chamber when the piston is in the second position.

3. The adjustable suspension according to claim 1, wherein the suspension body comprises an injection orifice fluidly communicating with the main fluid inlet and opening into the first chamber, and an evacuation orifice fluidly communicating with the fluid outlet and opening into the suspension body.

4. The adjustable suspension according to claim 3, wherein the piston is movable in a direction of displacement, and wherein the evacuation orifice and the injection orifice are disposed in distant positions considered in said direction of displacement.

5. The adjustable suspension according to claim 4, wherein one or more of the evacuation orifice and the injection orifice are formed in a side wall of the suspension body.

6. The adjustable suspension according to claim 3, wherein said evacuation orifice opens into an evacuation chamber fluidly communicating with the fluid outlet.

7. The adjustable suspension according to claim 3, wherein the evacuation orifice is configured so as to open into the second chamber when the piston is in the first position, and so as to open into the first chamber when the piston is in the second position.

8. The adjustable suspension according to claim 3, wherein the evacuation orifice opens into the second chamber, and wherein the piston head extends between the evacuation orifice and the injection orifice when the piston is in the second position.

9. The adjustable suspension according to claim 8, comprising a bypass channel configured to fluidly communicate the first and second chambers when the piston is in the second position.

10. The adjustable suspension according to claim 9, wherein the suspension body comprises an inner wall, and wherein the bypass channel is formed in said inner wall, the piston head being positioned at the bypass channel when the piston is in the second position, so that, in this second position, the first and second chambers are in fluid communication.

11. The adjustable suspension according to claim 9, wherein the piston is movable in a direction of displacement, wherein the evacuation orifice and the injection orifice are disposed in distant positions considered in said direction of displacement, and wherein, considered in the direction of displacement of the piston, the bypass channel extends between the evacuation orifice and the injection orifice.

12. The adjustable suspension according to claim 1, further comprising a valve device which can assume a first state in which it prevents fluid from escaping from the suspension, and a second state in which it allows the extraction of the fluid from the suspension.

13. The adjustable suspension according to claim 12, wherein the valve device comprises an inlet valve disposed at the main fluid inlet and an outlet valve disposed at the fluid outlet, said inlet and outlet valves being configured to open when the valve device is in the second state and to close when the valve device is in the first state.

14. The adjustable suspension according to claim 12, wherein the valve device is configured to be brought into the second state when a fluid is injected through the main fluid inlet and to be brought into the first state when the fluid injection is interrupted.

15. The adjustable suspension according to claim 1, wherein the fluid is a gas.

16. The adjustable suspension according to claim 15, wherein the fluid is carbon dioxide.

17. A bicycle including at least one adjustable suspension according to claim 1.

18. A method for adjusting an adjustable suspension for a bicycle, comprising:
providing:
a suspension body provided with a main fluid inlet configured to inject a fluid into the suspension body, and with a fluid outlet;
a piston disposed in the suspension body and comprising a piston head delimiting a first chamber and a second chamber inside said suspension body, the first chamber being in fluid communication with the main fluid inlet, the piston being movable in translation in the suspension body between:
at least one first position in which the fluid outlet fluidly communicates with the second chamber but not with the first chamber, so as to deploy the piston, and
at least one second position in which the fluid outlet is in fluid communication with the first chamber so that the fluid injected through the main fluid inlet is guided to the fluid outlet, in order to evacuate the injected fluid from the suspension;
including the first chamber in fluid communication with the atmosphere;
compressing the suspension so as to evacuate the fluid from the first chamber and place the piston in the first position;
injecting the fluid into the first chamber through the main fluid inlet of the suspension body so as to displace the piston to its second position, in which the fluid injected through the main fluid inlet is guided to the fluid outlet; and then
interrupting the fluid injection and closing the main fluid inlet and the fluid outlet so that the fluid remains in the suspension.

19. An adjustable suspension for a bicycle, comprising:
a suspension body provided with a main fluid inlet configured to inject a fluid into the suspension body, and with a fluid outlet;
a piston disposed in the suspension body and comprising a piston head delimiting a first chamber and a second chamber inside said suspension body, the first chamber being in fluid communication with the main fluid inlet, the piston being movable in translation in the suspension body between:
at least one first position in which the fluid outlet fluidly communicates with the second chamber but not with the first chamber, so as to deploy the piston, and
at least one second position in which the fluid outlet is in fluid communication with the first chamber so that the fluid injected through the main fluid inlet is guided to the fluid outlet, in order to evacuate the injected fluid from the suspension, the piston being configured to move from the first position to the second position when fluid is injected through the main fluid inlet; and
a valve device which can assume a first state in which it prevents fluid from escaping from the suspension, and a second state in which it allows the extraction of the fluid from the suspension, the valve device comprising an inlet valve disposed at the main fluid inlet and an outlet valve disposed at the fluid outlet, said inlet and outlet valves being configured to open when the valve device is in the second state and to close when the valve device is in the first state.

20. An adjustable suspension for a bicycle, comprising:
a suspension body provided with a main fluid inlet configured to inject a fluid into the suspension body, with a fluid outlet, an injection orifice fluidly communicating with the main fluid inlet, and an evacuation orifice fluidly communicating with the fluid outlet and opening into the suspension body;
a piston disposed in the suspension body and comprising a piston head delimiting a first chamber and a second chamber inside said suspension body, the injection orifice opening into said first chamber while the evacuation orifice opens into the second chamber, the first chamber being in fluid communication with the main fluid inlet, the piston being movable in translation in the suspension body between:
at least one first position in which the fluid outlet fluidly communicates with the second chamber but not with the first chamber, so as to deploy the piston, and
at least one second position in which the piston head extends between the evacuation orifice and the injection orifice and in which the fluid outlet is in fluid communication with the first chamber so that the fluid injected through the main fluid inlet is guided to the fluid outlet, in order to evacuate the injected fluid from the suspension, the piston being configured to move from the first position to the second position when fluid is injected through the main fluid inlet.

* * * * *